United States Patent
Pusch et al.

[11] Patent Number: 6,092,615
[45] Date of Patent: Jul. 25, 2000

[54] POWER ASSISTED MANUALLY PROPELLED VEHICLE AND WHEEL ASSEMBLY THEREOF

[75] Inventors: Martin Pusch; Karl-Heinz Klingebiel; Thomas Brendel, all of Duderstadt, Germany

[73] Assignee: Otto Bock Orthopaedische Industrie Besitz-und Verwaltungs-Kommandit-Gesellschaft, Duderstadt, Germany

[21] Appl. No.: 09/031,559

[22] Filed: Feb. 27, 1998

[30] Foreign Application Priority Data

Feb. 28, 1997 [DE] Germany ............... 197 08 058

[51] Int. Cl.$^7$ ............................................. B60K 1/00
[52] U.S. Cl. ...................... 180/65.5; 180/65.6; 180/907
[58] Field of Search .................... 180/65.1, 65.2, 180/65.5, 65.6, 65.8, 907

[56] References Cited

U.S. PATENT DOCUMENTS

| | | | |
|---|---|---|---|
| 4,671,524 | 6/1987 | Haubenwallner | 280/212 |
| 5,197,559 | 3/1993 | Garin, III et al. | 180/65.1 |
| 5,199,520 | 4/1993 | Chen | 180/65.5 |
| 5,427,193 | 6/1995 | Avakian | 180/65.5 |
| 5,450,915 | 9/1995 | Li | 180/65.5 |
| 5,477,935 | 12/1995 | Chen | 180/65.5 |
| 5,540,296 | 7/1996 | Strothman . | |
| 5,755,304 | 5/1998 | Trigg et al. | 180/65.5 |
| 5,771,988 | 6/1998 | Kikutani et al. | 180/65.5 |
| 5,857,537 | 1/1999 | Matsumoto et al. | 180/206 |
| 5,878,829 | 3/1999 | Kanno et al. | 180/65.5 |
| 5,894,902 | 4/1999 | Cho | 180/65.5 |

FOREIGN PATENT DOCUMENTS

| | | |
|---|---|---|
| 0 691 232 A2 | 1/1996 | European Pat. Off. . |
| 94 22 016 | 10/1997 | Germany . |
| 9-575 | 1/1997 | Japan . |
| WO 95/05141 | 2/1995 | WIPO . |
| WO97/00658 | 1/1997 | WIPO . |
| WO 97/05010 | 2/1997 | WIPO . |

*Primary Examiner*—J. J. Swann
*Assistant Examiner*—Christopher Bottorff
*Attorney, Agent, or Firm*—Foley & Lardner

[57] ABSTRACT

A manually propelled vehicle has a power assisted drive wheel assembly coupled to a stationary chassis and a control system for actuating the powering. The drive wheel assembly is integrated with a gearless electric motor. The motor includes a stator and a rotor rotatable relative to the stator. The drive wheel assembly includes a stationary wheel support coupled to the chassis and a rotatable drive wheel rotatably mounted to the stationary wheel support. The drive wheel has an outer rim and an inner ring, the outer rim being connected to the inner ring by support members. The stationary wheel support includes a first annular well for housing the control system and a power source, and a second annular well formed concentrically around the first annular well. The stator is mounted to the stationary wheel support in the second annular well and the rotor is mounted to the inner ring, which is rotatably coupled to the distal portion of the stationary wheel support via bearings. The drive wheel freely rotates relative to the stationary wheel support when no power is applied to the electric motor or if the motor fails. A grip ring is connected to the drive wheel. The control system includes a torque sensor for detecting torque applied by the grip ring. The signal from the torque sensor is used as a variable for activating the motor.

16 Claims, 5 Drawing Sheets

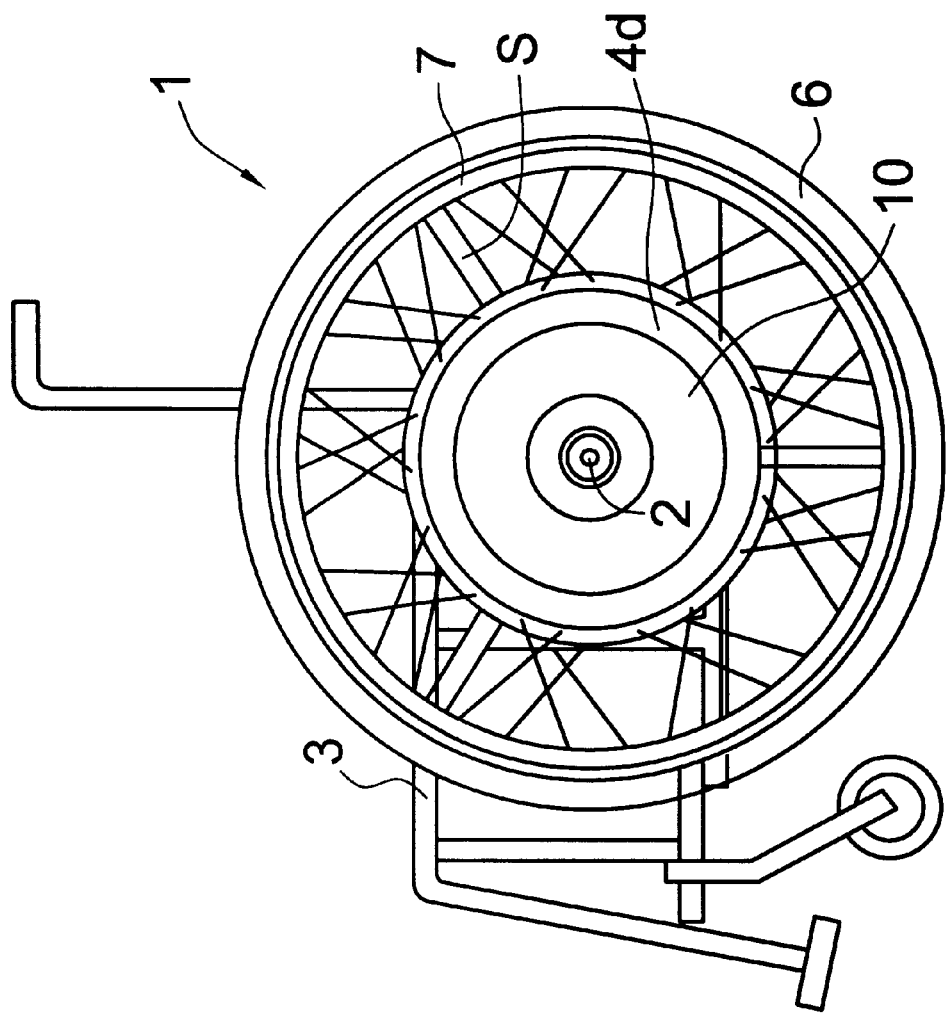

POWER ASSISTED MANUALLY PROPELLED VEHICLE AND WHEEL ASSEMBLY THEREOF

BACKGROUND OF THE INVENTION

The present invention relates to a power assisted manually propelled vehicle, in particular a wheelchair, as well as to a power assisted wheel assembly thereof.

A German patent publication, DE 94 22 016 U1, discloses a power assisted caddie cart having two wheels. Each of the two wheels can have an integrated auxiliary drive for powering the cart. The auxiliary drive, which is a three-phase synchronous electric motor of the external rotor type, is operationally coupled to the respective wheel to deliver additional torque by means of a control system. One portion of the motor, the stator, is positioned on the rim of the driving wheel, which rim is rotatably mounted on the axle hub of a stationary wheel support.

The auxiliary drive comprises a rotatable wheel that encloses around the stationary wheel support. Rotor magnets are positioned on the inner side of the rotatable wheel. A tire and rim combination is screwed or bolted to a radially extending flange formed on the outer circumference of the rotatable wheel. The stationary wheel support is fixedly mounted to an axle having an elongate casing that houses batteries. The wheels are arranged on axle journals that are attachable by means of rotationally secure plug connections, which are combined with plug connections for control lines, power supply lines, and the like, leading into the wheels. Wire strain gauges are used as a torque sensor.

One object of the invention is to improve the vehicle of the type described above, in particular with regard to its structure and control system.

A further object resides in providing an improved power assisted wheelchair.

SUMMARY OF THE INVENTION

The present invention is drawn to a power assisted manually propelled vehicle and a power assisted wheel assembly thereof. The power assisted wheel assembly includes stationary wheel support coupled to a vehicle chassis, a rotatable wheel rotatably mounted to the stationary wheel support, and an electric motor having a moving part and a stationary part. The electric motor preferably is gearless. The stationary part is coupled to the stationary wheel support and the moving part is coupled to the rotatable wheel. The moving part is concentrically situated over the stationary part with a gap therebetween. The rotatable wheel is freely rotatable relative to the stationary wheel support when the electric motor is not powered or fails. A control system is provided for selectively activating the motor.

The moving part comprises a rotor having rotor magnets and the stationary part comprises a stator having stator windings. The stationary wheel support includes a first annular well and a second annular well concentric with and around the first annular well. The first annular well is adapted to house a power supply, such as a battery or accumulator, and the control system. The second well can house the stator.

The stationary wheel support can include an axially extending hub, a first portion extending radially from one end of the hub, and a second portion extending axially from an outer end of the first portion toward the other end of the hub, a pair of axially spaced radially extending sections extending radially from the second section. The first annular well is formed between the hub and the second portion, and the second annular well is formed between the radially extending sections.

The drive wheel can include an outer rim and an inner ring, with the outer rim connected to the inner ring by support members, such as wheel spokes or blades. The inner ring is rotatably mounted to the radially extending sections. The rotor is connected to the inner ring, concentrically over the stator with a gap therebetween.

The wheel assembly also includes a grip ring connected to the rotatable wheel. The control system includes a torque sensor for detecting torque applied to the grip ring.

In one aspect of the invention, the torque sensor can comprise two collinearly positioned annular discs, each having slits of equal width positioned therearound, a light emitter, and a light detector. The discs are positioned between the light emitter and the light detector. The light emitter is adapted to emit a light beam directed in an axial direction and the light detector is adapted to receive light passing through the slits. The light detector generates an electric signal based on the amount of light detected for controlling the actuation of the motor.

One of the discs can be connected to the grip ring and the other to the rotatable wheel. The two discs can be connected together via resilient couplings, such as torsion springs. Specifically, the other disc can be connected to the inner ring.

In another aspect of the invention, the grip ring is connected to the rotatable wheel via leafsprings and rotatable pins, which are rotatably mounted relative to the rotatable wheel, such as the rim. The torque sensor comprises a rotation transducer associated with one of the pins. The associated pin is rotatably mounted relative to the rotation transducer, which converts pin rotation into an electrical signal for controlling the actuation of the motor.

In another aspect of the invention, the grip ring is connected to the rotatable wheel via leafsprings and shafts, which are rotatably coupled to the rotatable wheel. The torque sensor comprises a sensor attached to the stationary wheel support and associated with one of the shafts, and a moving ring coupled to the rotatable wheel. The associated shaft is mounted kinematically to the moving ring so that twisting of the shaft resulting from torque applied to the grip ring displaces the moving ring in the axial direction with respect to the sensor, which converts the movement of the moving ring into an electrical signal for controlling the actuation of the motor. Specifically, the shafts can be rotatably connected to the rim or the inner ring, or both, and the moving ring can be mounted to the inner ring.

In another aspect of the invention, the wheel assembly is mechanically connected to the chassis via a quick-acting coupling, without a need for any electrical or wire routing paths.

BRIEF DESCRIPTION OF THE DRAWINGS

These and other features, aspects, and advantages of the present invention will become more apparent from the following description, appended claims, and accompanying exemplary embodiments shown in the drawings, which are briefly described below.

FIG. 6 shows in sideview a wheelchair.

DETAILED DESCRIPTION OF THE PREFERRED EMBODIMENTS

Figure 1:
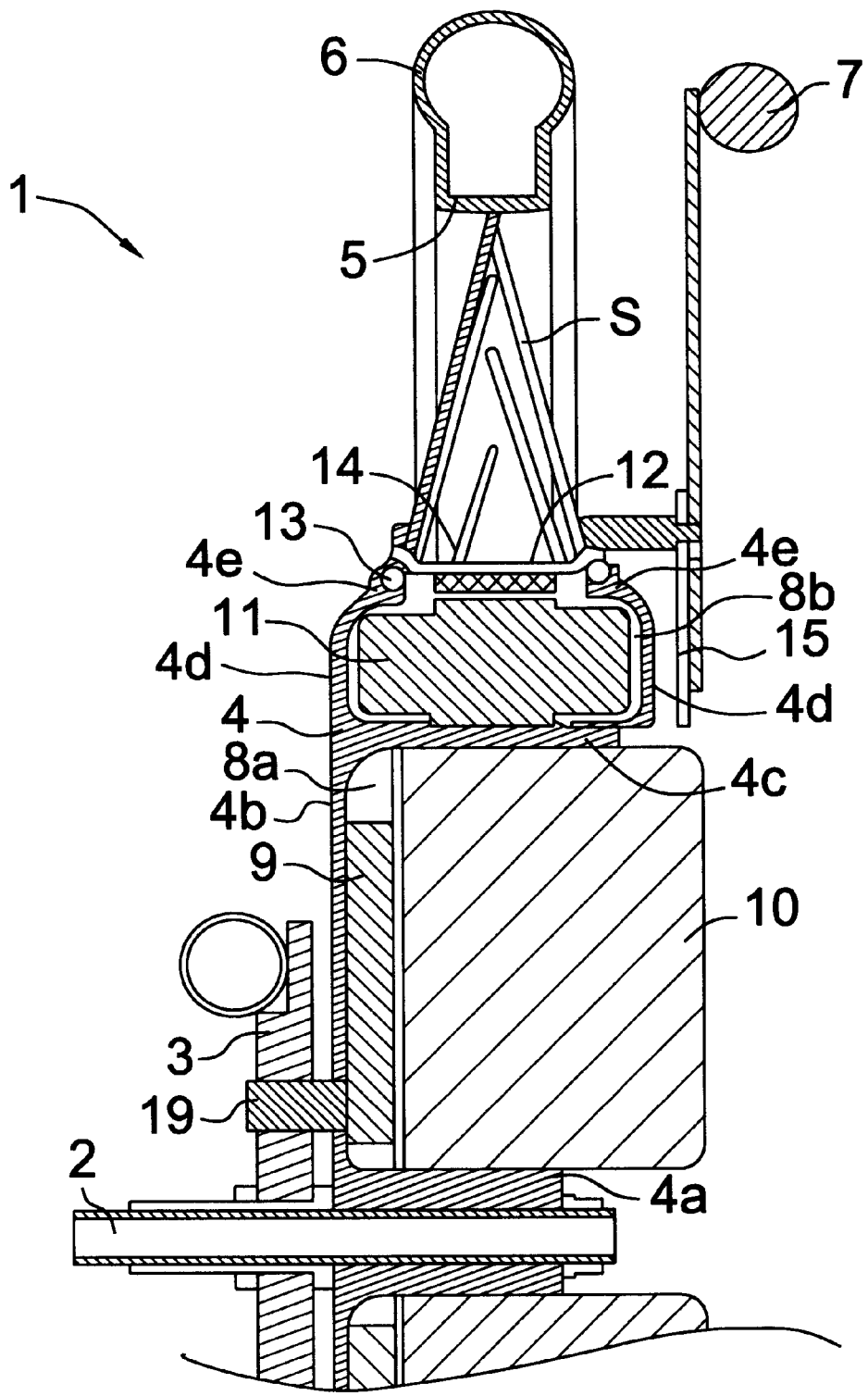
FIG. 1 shows a cross-sectional view through the right-hand rear driving wheel of a wheelchair embodying the present invention.
Figure 2:
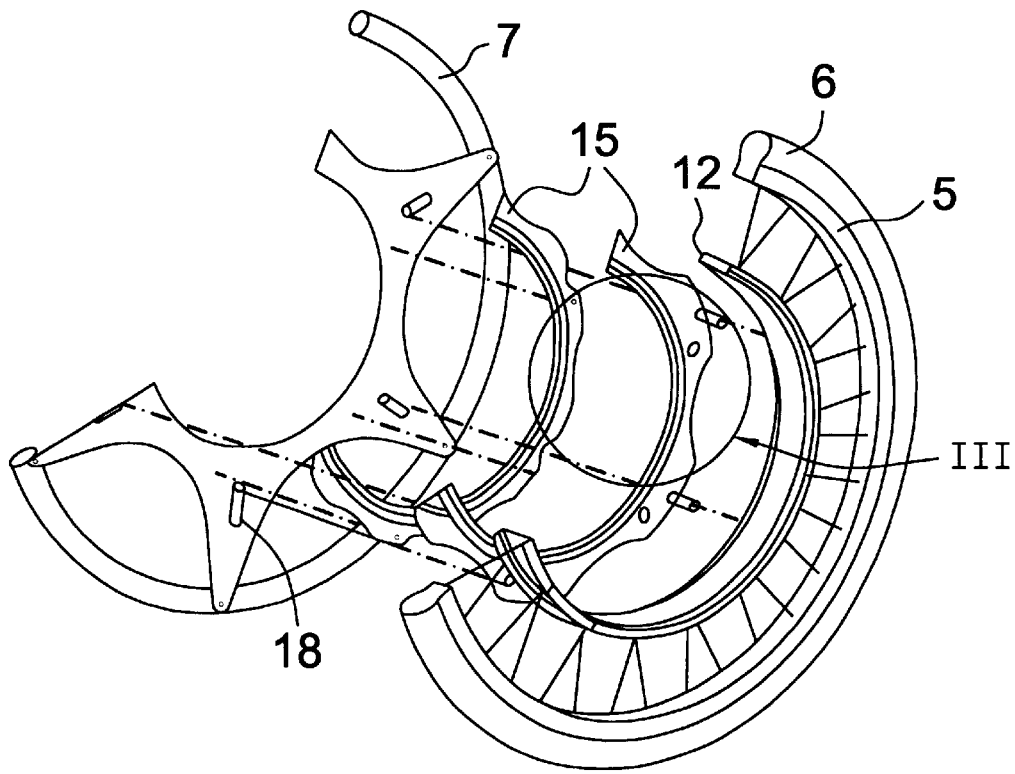
FIG. 2 shows an exploded view of the mechanical parts of a torque sensor.
Figure 3:
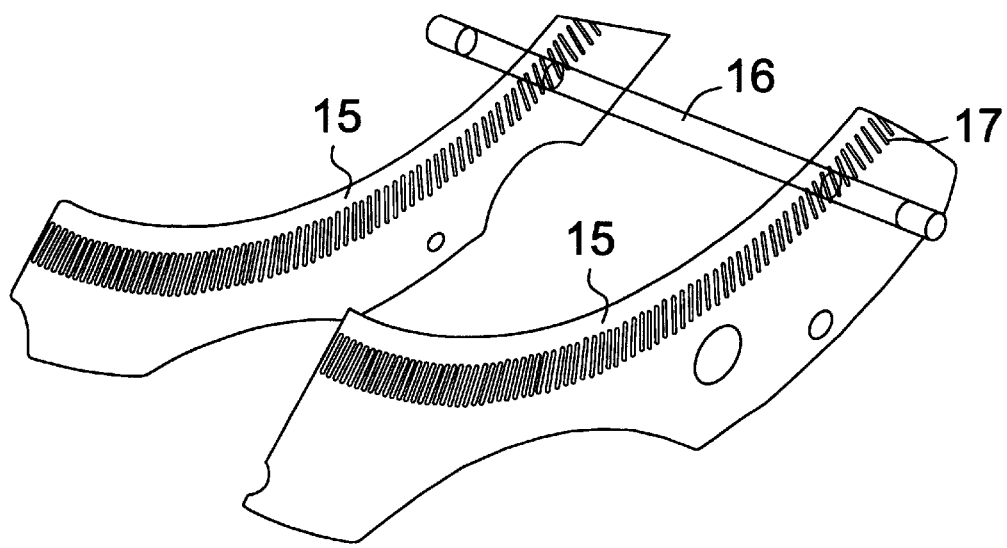
FIG. 3 shows an enlarged detailed perspective view taken from section III of FIG. 2.

Three exemplary embodiments, as shown in FIGS. 1–3, 4, and 5 serve to illustrate the present invention. Same or corresponding elements are labelled with the same reference numerals. Also, although references are made below to directions in describing the structure, they are made relative to the drawings (as normally viewed) for convenience. The directions, such as horizontal, vertical, etc., are not intended to be taken literally or limit the present invention in any form.

FIG. 1 shows a cross-sectional view of a driving wheel assembly 1, which is mechanically connected, via a quick-acting coupling 2, to a chassis 3 of a wheeled vehicle, e.g., a wheelchair as shown in FIG. 6. The driving wheel assembly 1 includes a stationary wheel support 4. An antitorsion device 19 connects the wheel support 4 to the chassis 3 to provide support and prevent the wheel assembly from twisting with respect to the chassis 3. A gearless electrical motor (11, 14) is integrated with the driving wheel assembly 1. The motor includes a stator 11 having stator windings and a rotor 14 having rotor motors. The motor is positioned between the stationary wheel support 4 and the rotatable wheel portion, which comprises an outer wheel rim 5 with an attached tire 6, a grip ring 7, wheel spokes or rim supports S, and an inner or rotor housing ring 12, for manually imparting torque to the rotatable wheel portion.

The stationary wheel support 4 has a hub 4a extending axially (horizontally), coaxial with the coupling 2, a first portion 4b extending radially (vertically) from one end of the hub section 4a, and a second portion 4c extending axially (horizontally) from the outer end of the first portion 4b toward the other *end of the hub 4a so that the second portion 4c is substantially coaxial or concentric with the hub 4a. The first portion 4b is preferably circular, with the second portion 4c being ring-shaped extending from the periphery of the first portion 4b. A first annular well or space 8a is formed between the hub 4a and the second portion 4c and runs concentrically around the hub 4a. This well 8a accommodates or houses a control system 9 for activating the motor and a power source or supply 10, such as an accumulator or battery(ies). A second annular well or space 8b is formed by a pair of axially spaced, radially extending end sections 4d extending from the second portion 4c. The second annular well 8b is substantially concentric around the first annular well 8a.

Figure 4:
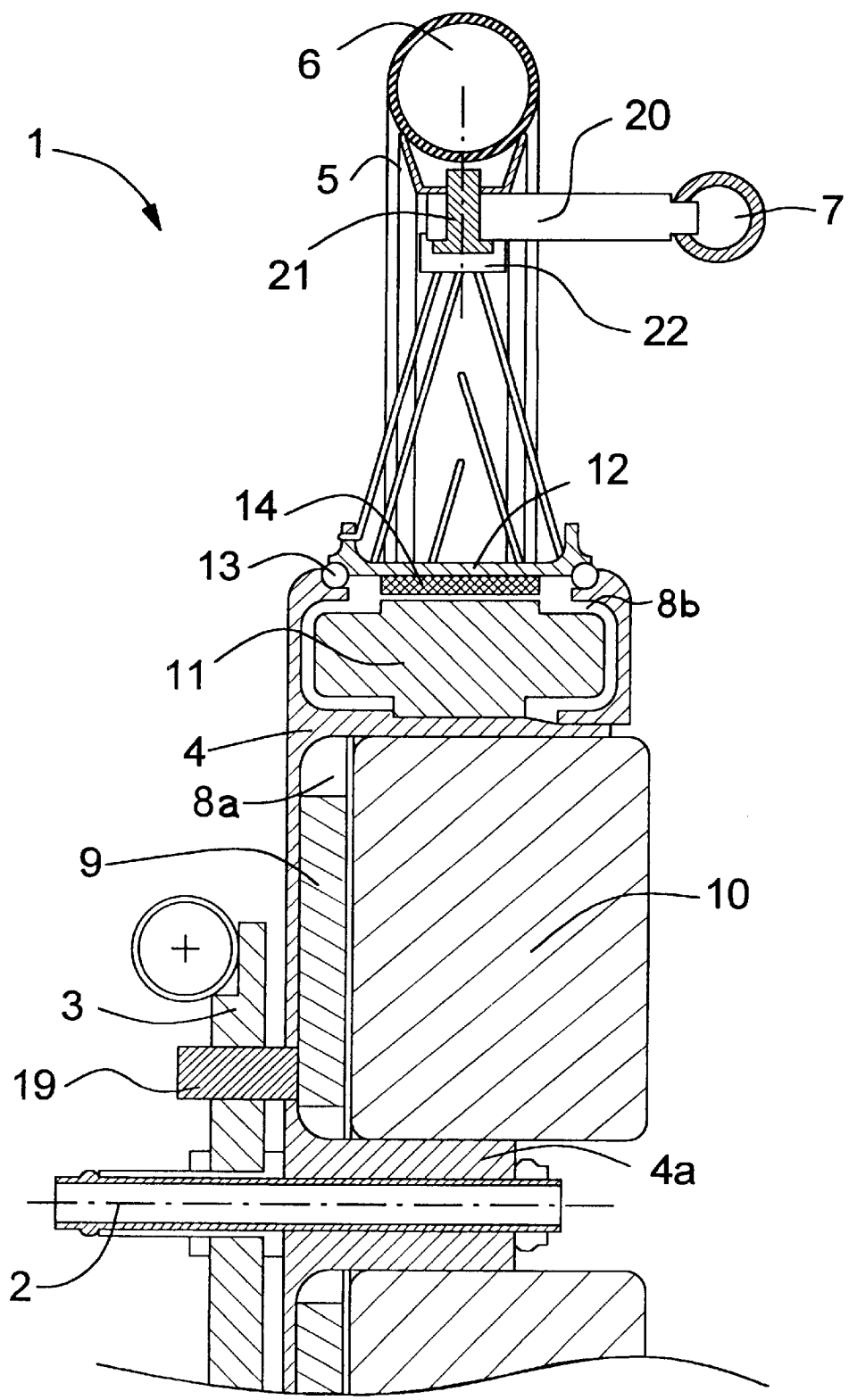
FIG. 4 shows another embodiment similar to FIG. 1, with alternative embodiment of a torque sensor.
Figure 5:
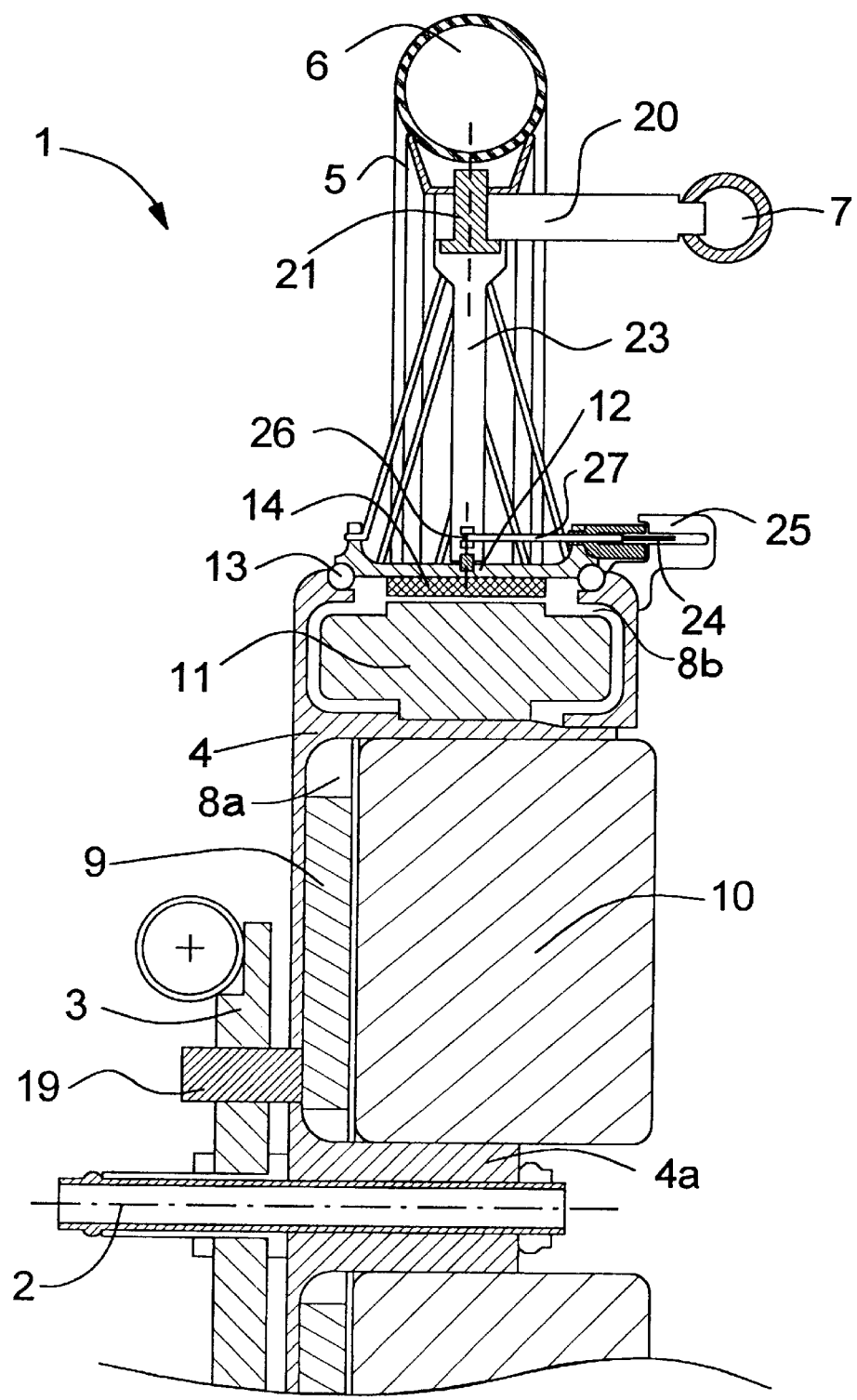
FIG. 5 shows yet another embodiment similar to FIG. 4, with alternative embodiment of a torque sensor.

The stator 11, which includes stator windings, is preferably attached to the second portion 4c and preferably positioned or confined within the second annular well 8b as shown in FIGS. 1, 4, and 5. The rotor housing ring 12 is rotatably mounted on the external circumference of the wheel support 4 via ball bearings 13, between annular webs 4e formed on the distal circumferential ends of the radially extending end sections 4d. The rotor 14, which includes rotor magnets, is attached to the rotor housing ring 12. The rotor 14 is positioned opposite the stator 11 concentrically therearound, with a narrow gap or space therebetween. The rotor 14 rotates with the rotatable wheel portion, whereas the stator 11 remains stationary. It is possible to reversely position the rotor and the stator.

The rim 5 and the tire 6 concentrically surround and connect to the rotor housing ring 12 via the supports S, such as spokes or blades, or the like. In all embodiments shown, the grip ring 7 is positioned parallel and collinear with the rim 5. The rim, 5, the tire 6, the supports S, the rotor housing ring 12, the rotor 14, and the grip ring 7, with its supports (described below), rotate together.

In the embodiment of FIG. 1, the grip ring is connected to one side of the rotor housing ring 12 via two collinear annular discs 15. The control system 9 includes an optical torque sensor that detects torque applied to the grip ring 7. The torque sensor includes a light beam emitter and a detector, and the two annular discs 15, one of which is connected to the grip ring 7 and the other to the rotor housing 12. The two discs 15 are also connected to each other with resilient couplings, such as torsion springs 18. These discs 15 are concentric with the grip ring 7 and the wheel. Each of these discs 15 has a plurality of substantially radially extending slits 17 of equal width, equally spaced apart therearound. The discs are preferably positioned between the emitter and the detector. For example, the slits of the two discs can be aligned at rest (when no or little torque is applied to the grip ring 7) so that a maximum amount of light beam 16 from the emitter, which light beam is directed in the axial direction, can pass through the aligned slits. The amount of light passing through the slits changes as the discs rotate relative to each other (resulting from torque exerted to the grip ring 7), losing slit alignment. An analog signal representing the amount of light or attenuated light received by the detector is output to the control system 9, which can be a microprocessor based instrument. Depending on this signal, the control system can automatically activate the motor.

The embodiment illustrated in FIG. 4 is similar to FIG. 1, except that the grip ring 7 is connected to the rim 5 via leafsprings 20 and pins 21. The leafsprings 20 are mounted using the pins 21, one for each leafspring, around the rim, preferably equally spaced therearound. Each pin 21 is mounted to the rim 5 around a pin axis extending radially (perpendicular to the wheel axle). One of the pins 21 is associated with a rotation transducer 22, which is mounted to the rim 5. The associated pin is rotatable relative to the transducer. The transducer 22 converts the amount of pin rotation resulting from torque exerted to the grip ring 7 into an analog electrical signal. This signal can be used to automatically actuate the motor. In this case, the pin rotation is dependent on the level of the torque introduced and the spring constant of the leafsprings 20. More than one rotation transducer can be used for a more accurate reading of torque. For example, two or more transducers can be used and the average of the output signal can be used as a control signal. The signal generated by the rotation transducer 22 can be transmitted optically or by a radio transmission from the rotating part of the wheel to the motor control system 9, which is positioned in the stationary wheel support 4, the non-rotating part of the wheel assembly 1. This eliminates the need for a signal wiring between the relatively moving components.

The embodiment illustrated in FIG. 5 is similar to FIG. 4, except that the grip ring 7 is connected to rim 51 via shafts 23. The shafts are rotatably mounted to the rim 5. One of the shafts is coupled kinematically to a moving ring 24, which is connected to the ring 12, so that twisting of the shaft 23 resulting from torque induced to the grip ring 7 displaces the moving ring 24 axially and with respect to a sensor 25 attached to the stationary wheel support 4 (to the outer of the radially extending end section 4d). This sensor converts the movement of the moving ring 24 into an electrical signal, which can be used to automatically actuate the motor. The kinematic connection between the shaft 23, which extends radially (perpendicular to the wheel axle) between the rim 5 and the ring 12, and the moving ring 24 is effected via a lever 26 articulated on the associated shaft 23 at right angles thereto and a connecting rod 27, one of which is rotatably coupled to the outer end of the lever 26. The other end of the connecting rod 27 is coupled to the moving ring 24. Again, additional sensors of the same arrangement can be used for a more accurate reading of torque.

The present driving wheel assembly advantageously has a wheel support with an annular space, which runs concentrically around a hub section of the wheel support. This annular space accommodates the motor control system and an accumulator (power supply). The driving wheel assembly has a rotor mounted on the radially external circumference of the wheel support and a grip ring. The motor control system has a torque sensor for detecting torque introduced into the grip ring and automatically activating the motor.

In one embodiment, the torque sensor may have two annular discs, arranged collinearly. Each disc have slits of equal width spaced uniformly around the disc. The discs are connected to the grip ring and the rotor housing ring, and also to one another by means of torsion springs. A light beam is directed in the axial direction so that the amount of light passing through the slits is represented as an analog signal, which represents the control variable for automatically activating the motor.

In another embodiment, the grip ring can be connected to a moving portion of the wheel assembly, preferably the wheel rim, via leafsprings and pins. The pins are rotatably mounted preferably to the wheel rim. At least one of the pins is associated with a rotation transducer, where the pin is rotatable relative thereto. The transducer converts the pin rotation resulting from torque induced manually into the grip ring into an electrical signal, which can be used to automatically actuate the motor.

In yet another modified embodiment, the grip ring can be connected to a moving portion of the wheel, preferably the wheel rim, via leaf-springs and shafts. The shafts are rotatably mounted to the wheel rim. At least one of the shafts is associated with a sensor. The associated shaft is coupled kinematically to a moving ring, which is connected to the moving portion of the wheel assembly. The twisting of that shaft, resulting from torque induced to the grip ring, displaces the moving ring parallel to the wheel axle and toward the sensor, which is attached to a non-rotating portion of the wheel assembly, preferably extending radially on the outer side of the stationary wheel support. The sensor converts the moving ring movement into an electrical signal, which can be used to automatically actuate the motor.

In each of these embodiments, the driving wheel can be mechanically connected to the vehicle chassis means of a quick-acting coupling. This requires no electrical connection.

Ball bearings are preferably positioned on the distal radial portion of the stationary wheel support to advantageously reduce the mass of the rotating portion(s) of the wheel assembly. With this structure, the stationary wheel support can be made with increased space, with one open side, for accommodating the accumulator, the associated electronic control system, and the torque sensor.

An electrically commutated electric motor with a high effective moment and a low rotational speed can be used to effectively eliminate gears, which decreases rolling resistance and provide an effective freewheeling capability. One of the ways in which power assist can be used is to accelerate or brake. For instance, to move uphill or an incline, the user needs to exert more force to battle gravity; the power assist can provide additional torque. Similarly, if traveling a downhill, the user needs to exert force in the opposite direction, again to battle gravity. The motor can apply a reverse torque to stop the wheel.

According to the invention, if the control system fails or the accumulator or battery is drained, it defaults to a conventional manually propelled wheelchair.

The analog signal from the torque sensor represents the control variable for activating the motor. Using sensors, the control system, which is preferably a microprocessor-based device, can also measure the position of the rotor relative to the stator. Powering the stator generates a magnet field and moves (rotates) the rotor, which causes the rim to rotate and accelerate or brake (reverse).

Suitable electronic connections, e.g., a generator, can be used to charge the accumulator during braking. The level to which the moment is increased can be determined via an adjustment means at the disposal of the user of the vehicle.

A rechargeable accumulator or battery can comprise a combination of nickel/cadmium or metal/hydride cells. The accumulator casing can be form-fitted into the annular space or well formed in the stationary wheel support. A higher capacity can be achieved on the basis of the volume available. A quick-acting coupling is provided to facilitate removal and assembly of the accumulator. A suitable power indicator or meter can be integrated in the accumulator to visually indicate its capacity.

In the first embodiment of the torque sensor, the measurement principle according to the invention is based on the attenuation of a light beam. The torque to be measured slightly twists the circular discs, which are connected to one another via a torsionally elastic coupling. Owing to the superposition of the slits and non-slit portion of the discs, the light attenuation within one sector width is proportional to the twisting angle between the annular discs. The light emitting and sensing components are connected to the non-moving part of the wheel assembly, e.g., the stationary support. The torque thus can be sensed without contact, enabling detection while the wheel is rotating. Advantageously, there is no need to transmit electrical signals from a rotating ring to fixed electronic contacts via slip rings, which are susceptible to faults.

The two other alternative solutions for the torque sensor each exhibit robust kinematic mechanisms for transmitting the torque, and are less susceptible to faults.

Given the disclosure of the present invention, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention. The scope of the present invention accordingly is to be defined as set forth in the appended claims.

The disclosure of the German priority application, DE 197 08 058.8 is incorporated by reference in its entirety, including the drawings, claims, and the specification thereof.

What is claimed is:

1. A power assisted manually propelled vehicle comprising:

a chassis;

a power assisted wheel assembly, which includes:
   stationary wheel support coupled to the chassis,
   a rotatable wheel rotatably mounted to the stationary wheel support, and
   an electric motor having a moving part and a stationary part, the stationary part being coupled to the stationary wheel support and the moving part being coupled to the rotatable wheel, the moving part being concentrically situated over the stationary part with a gap therebetween,
   wherein the rotatable wheel is freely rotatable relative to the stationary
wheel support when the electric motor is not powered; and
a control system for selectively activating the motor,
wherein the moving part comprises a rotor having rotor magnets and the stationary part comprises a stator having stator windings,
wherein the stationary wheel support includes a first annular well and a second annular well concentric with and around the first annular well, the first annular well being adapted to house a power supply and the control system, and the second well housing the stator,
wherein the stationary wheel support comprises an axially extending hub, a first portion extending radially from one end of the hub, and a second portion extending axially from an outer end of the first portion toward the other end of the hub, a pair of radially extending sections extending radially from the second portion, the first annular well being formed between the hub and the second portion and the second annular well being formed between the radially extending sections, and
wherein the rotatable wheel comprises an outer rim and an inner ring, the outer rim being connected to the inner ring by support members, the inner ring being rotatably mounted to the radially extending sections, the rotor being connected to the inner ring, concentrically over the stator with a gap therebetween.

2. A manually propelled vehicle according to claim 1, further including a grip ring connected to the rotatable wheel, wherein the control system includes a torque sensor for detecting torque applied to the grip ring.

3. A manually propelled vehicle according to claim 2, wherein the torque sensor comprises two collinearly positioned annular discs, each having slits of equal width positioned therearound, a light emitter, and a light detector, the discs being positioned between the light emitter and the light detector, wherein the light emitter is adapted to emit a light beam directed in an axially direction and the light detector is adapted to receive light passing through the slits, the light detector generating an electric signal based on the amount of light detected for controlling the actuation of the motor, one of the discs being connected to the grip ring and the other connected to the rotatable wheel, and the two disc being connected via resilient couplings.

4. A manually propelled vehicle according to claim 2, wherein the grip ring is connected to the rotatable wheel via leafsprings and shafts rotatably coupled to the rotatable wheel, the torque sensor comprising a sensor attached to the stationary wheel support and associated with one of the shafts, and a moving ring coupled to the rotatable wheel, the associated shaft being mounted kinematically to the moving ring so that twisting of the shaft resulting from torque applied to the grip ring displaces the moving ring in the axial direction with respect to the sensor, which sensor converts the movement of the moving ring into an electrical signal for controlling the actuation of the motor.

5. A power assisted manually propelled vehicle comprising:
a chassis;
a power assisted wheel assembly, which includes:
   stationary wheel support coupled to the chassis,
   a rotatable wheel rotatably mounted to the stationary wheel support,
   an electric motor having a moving part and a stationary part, the stationary part being coupled to the stationary wheel support and the moving part being coupled to the rotatable wheel, the moving part being concentrically situated over the stationary part with a gap therebetween, and
   a grip ring connected to the rotatable wheel via leafsprings and rotatable pins rotatably mounted relative to the rotatable wheel,
   wherein the rotatable wheel is freely rotatable relative to the stationary wheel support when the electric motor is not powered; and
a control system for selectively activating the motors
wherein the control system includes a torque sensor for detecting torque applied to the grip ring, the torque sensor comprising a rotation transducer associated with one of the pins, the associated pin being rotatably mounted relative to the rotation transducer, which rotation transducer converts a rotation of the associated pin into an electrical signal for controlling the actuation of the motor.

6. A power assisted manually propelled vehicle comprising:
a chassis;
at least one drive wheel assembly coupled to the chassis, the drive wheel being integrated with an electric motor, which motor includes a stator and a rotor rotatable relative to the stator; and
a control system for selectively activating the motor,
wherein the drive wheel assembly comprises:
   a stationary wheel support coupled to the chassis;
   a rotatable drive wheel rotatably mounted to the stationary wheel support,
wherein one of the stator and the rotor is mounted to the stationary wheel support and the other of the stator and the rotor is mounted to the rotatable drive wheel,
wherein the rotatable wheel freely rotates relative to the stationary wheel support when the electric motor is not powered,
wherein the stationary wheel support includes a first annular well housing the control system and for housing a power supply,
wherein the stationary wheel support further includes a second annular well concentrically around the first annular well,
wherein the stationary wheel support includes an axially extending hub, a first portion extending radially from one end of the hub, a second portion extending axially from an outer end of the first portion toward the other end of the hub, and a pair of radially extending sections extending radially from the second portion, the first annular well being formed between the hub and the second portion, and the second annular well being formed between the radially extending sections, and
wherein the drive wheel comprises an outer rim and an inner ring, the outer rim being connected to the inner ring by support members, the inner ring being rotatably mounted to the radially extending sections.

7. A manually propelled vehicle according to claim 6, wherein the stator is positioned in the second well and the rotor is connected to the inner ring, facing the stator with a gap.

8. A manually propelled vehicle according to claim 7, further including a grip ring connected to the drive wheel and wherein the control system includes a torque sensor for detecting torque applied to the grip ring.

9. A manually propelled vehicle according to claim 8, wherein the torque sensor comprises two collinearly positioned annular discs, each having slits of equal width positioned therearound, a light emitter, and a light detector, the discs being positioned between the light emitter and the light detector, wherein the light emitter is adapted to emit a light beam directed in an axially direction and the light detector is adapted to receive light passing through the slits, the light detector generating an electric signal for controlling the actuation of the motor.

10. A manually propelled vehicle according to claim 9, wherein one of the discs is connected to the grip ring and the other connected to the inner ring, and the two, disc connected via resilient couplings.

11. A manually propelled vehicle according to claim 8, further including leafsprings and rotatable pins for mounting the grip ring to the rotatable wheel, wherein the pins are rotatably mounted to the rim.

12. A manually propelled vehicle according to claim 11, wherein the torque sensor comprises a rotation transducer associated with one of the pins, the one pin being rotatable about the transducer, which converts a rotation of the pin into an electrical signal for controlling the actuation of the motor.

13. A manually propelled vehicle according to claim 8, further including leafsprings and rotatable shafts for mounting the grip ring to the rotatable wheel, wherein the shafts are rotatably mounted to the rim.

14. A manually propelled vehicle according to claim 13, wherein the torque sensor comprises a sensor attached to the stationary wheel support and linked to one of the shafts, a moving ring coupled to the inner ring, the linked shaft being connected kinematically to the moving ring so that twisting of the linked shaft resulting from torque applied to the grip ring displaces the moving ring in the axial direction with respect to the sensor, which sensor converts the movement of the moving ring into an electrical signal for controlling the actuation of the motor.

15. A manually propelled vehicle according to claim 6, wherein the driving wheel assembly is mechanically connected to the chassis via a quick-acting coupling.

16. A manually propelled vehicle according to claim 6, wherein the motor is gearless.

* * * * *